Dec. 12, 1967    M. A. KOCKEN ET AL    3,357,341
FRYER SCALE
Filed Oct. 20, 1965    4 Sheets-Sheet 1
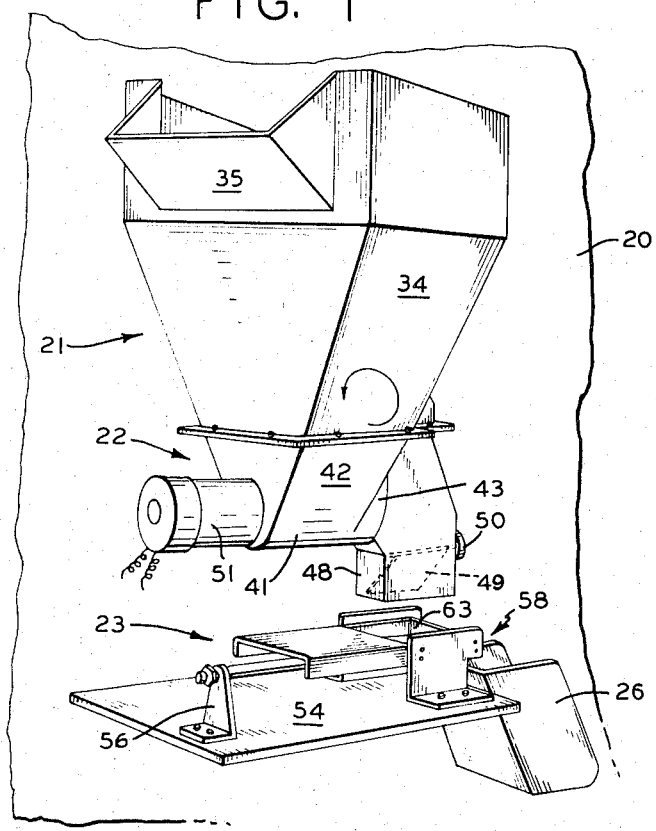
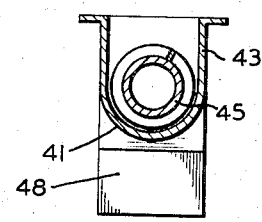
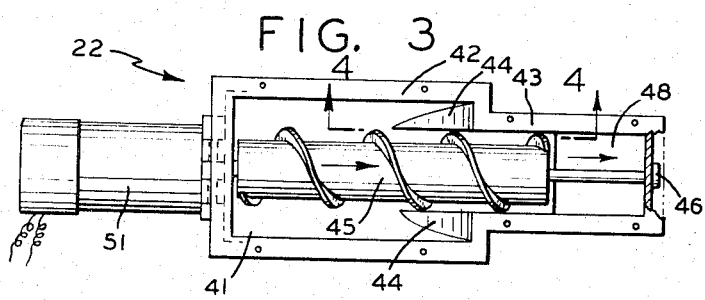
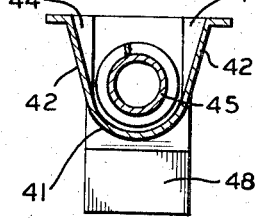
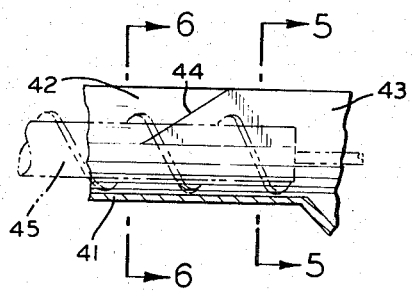
INVENTOR.
MAXIMILIAAN A. KOCKEN
HARRY STAMMER
BY
Arthur J Plantamura
ATTORNEY.

Dec. 12, 1967  M. A. KOCKEN ET AL  3,357,341
FRYER SCALE

Filed Oct. 20, 1965  4 Sheets-Sheet 3

INVENTOR.
MAXIMILIAAN A. KOCKEN
HARRY STAMMER
BY
Arthur J. Plantamura
ATTORNEY.

Dec. 12, 1967  M. A. KOCKEN ET AL  3,357,341
FRYER SCALE

Filed Oct. 20, 1965  4 Sheets-Sheet 4

INVENTOR.
MAXIMILIAAN A. KOCKEN
HARRY STAMMER
BY
*Arthur J. Plantamura*

ATTORNEY.

United States Patent Office 3,357,341
Patented Dec. 12, 1967

3,357,341
FRYER SCALE
Maximiliaan Albert Kocken, Stamford, and Harry Stammer, West Haven, Conn., assignors to American Machine & Foundry Company, a corporation of New Jersey
Filed Oct. 20, 1965, Ser. No. 498,557
11 Claims. (Cl. 99—334)

ABSTRACT OF THE DISCLOSURE

A portion-weighing, dispensing, and cooking apparatus which is automatically operable on demand, comprising in combination: a storage hopper to hold a supply of random sized particulated material; a screw conveyor operably housed at the base of said hopper to convey particulated material deposited on said conveyor from said hopper; a scale fed by said screw conveyor and arranged to stop the feeding action of said screw conveyor when a portion of predetermined weight has been fed by said conveyor onto said scale; a sweep mechanism to remove said portion from said scale to dispense said portion to a cooking station; drive means for said conveyor; and means to synchronize the operation of the conveyor drive and the sweep mechanism and the scale so that when a predetermined portion is deposited on said scale, said conveyor is stopped and said sweep mechanism is activated to remove the weighed portion from said scale.

---

This invention relates to dispensing apparatus and more particularly to a dispenser capable of storing random sized elongated discrete material in bulk and automatically dispensing individual uniform portions from storage on demand. To facilitate the description, the machine of the invention will be described in its function in connection with the dispensing of frozen cut potatoes of the kind which, when cooked, are conventionally sold as french fries, but it will be apparent to one skilled in the art that the apparatus may be usefully adapted to dispense other material which is non-uniform in size and which, when stored in bulk, because of its nature, is difficult to dispense in uniform increments.

In a more specific embodiment, the invention relates to an apparatus which may be combined with and form a part of a machine such as that described in the pending U.S. application of H. Congelli et al., entitled Automated Fryer, S.N. 492,742, filed Oct. 4, 1965, which is capable of automatically accepting, frying, and dispensing material fed thereto for cooking. Apparatus of this kind may also advantageously form a part of an automated system for preparing and dispensing various additional articles of food, ready for consumption by a customer. Because of its automatic capability it may be used in an automated restaurant system of the kind, for example, which includes a centrally located attended control station where orders for food items are received directly, or by telephone or microphone, or other voice communication device, such as may be found at drive-in restaurants. An automated restaurant of this kind which on demand operates through electronic ordering and billing equipment in conjunction with a variety of different food preparing machines to cook and dispense food items which are the conveyed and assembled at a central location, is disclosed, for example in the pending U.S. patent application of N. Alpert et al., S.N. 219,222, filed on Aug. 24, 1962, now U.S. Patent No. 3,267,436, issued Aug. 16, 1966.

The cut potato dispensing apparatus of this invention is characterized by its reliable on-demand capability. The machine comprises an independently operable unit as distinguished from a continuous production machine so that even though one or more hours may elapse since a prior item has been dispensed, upon demand, it functions rapidly and reliably to dispense a single or an indefinite number of consecutive portions. The machine is also characterized by its control features which are sequentially operable and perform a function from a single electrical impulse which synchronously triggers later functions to produce the end result of delivering a cooked portion in a serving container.

It is an object of the present invention to provide a novel apparatus for storing material in bulk and automatically dispensing individual substantially even weight, portions on demand.

It is another object of the invention to provide an automatically operable apparatus which feeds from bulk storage onto a scale, uniform portions of frozen french fry potatoes, wherein the feed means is controlled by the weight on the scale.

It is still another object of the invention to provide an apparatus which automatically dispenses uniform portions of material from bulk storage wherein means are provided to afford uniform feed of the material and prevent bridging of material remaining in the stored bulk.

It is still a further and more particular object of the invention to provide a self-contained, automatic dispensing unit which may readily be incorporated as a part of an electronic ordering and billing system so that upon remote command, the machine feeds individual portions to a cooking machine, which, in turn, delivers the assembled cooked product by conveyor to a central assembly station.

The above and other objects and features and advantages of the invention will be better understood from the following detailed description thereof when considered in conjunction with the accompanying drawing in which:

FIG. 1 is a perspective of apparatus of the invention which includes a hopper surmounting a scale assembly positioned in a refrigerator compartment which is shown in fragment.

FIG. 3 is a plan view of the feed screw assembly and drive therefor.

FIG. 4 is a sectional view taken along line 4—4 of FIG. 3.

FIG. 5 is a sectional view taken along line 5—5 of FIG. 4.

FIG. 6 is a sectional view taken along line 6—6 of FIG. 4.

Figure 2:
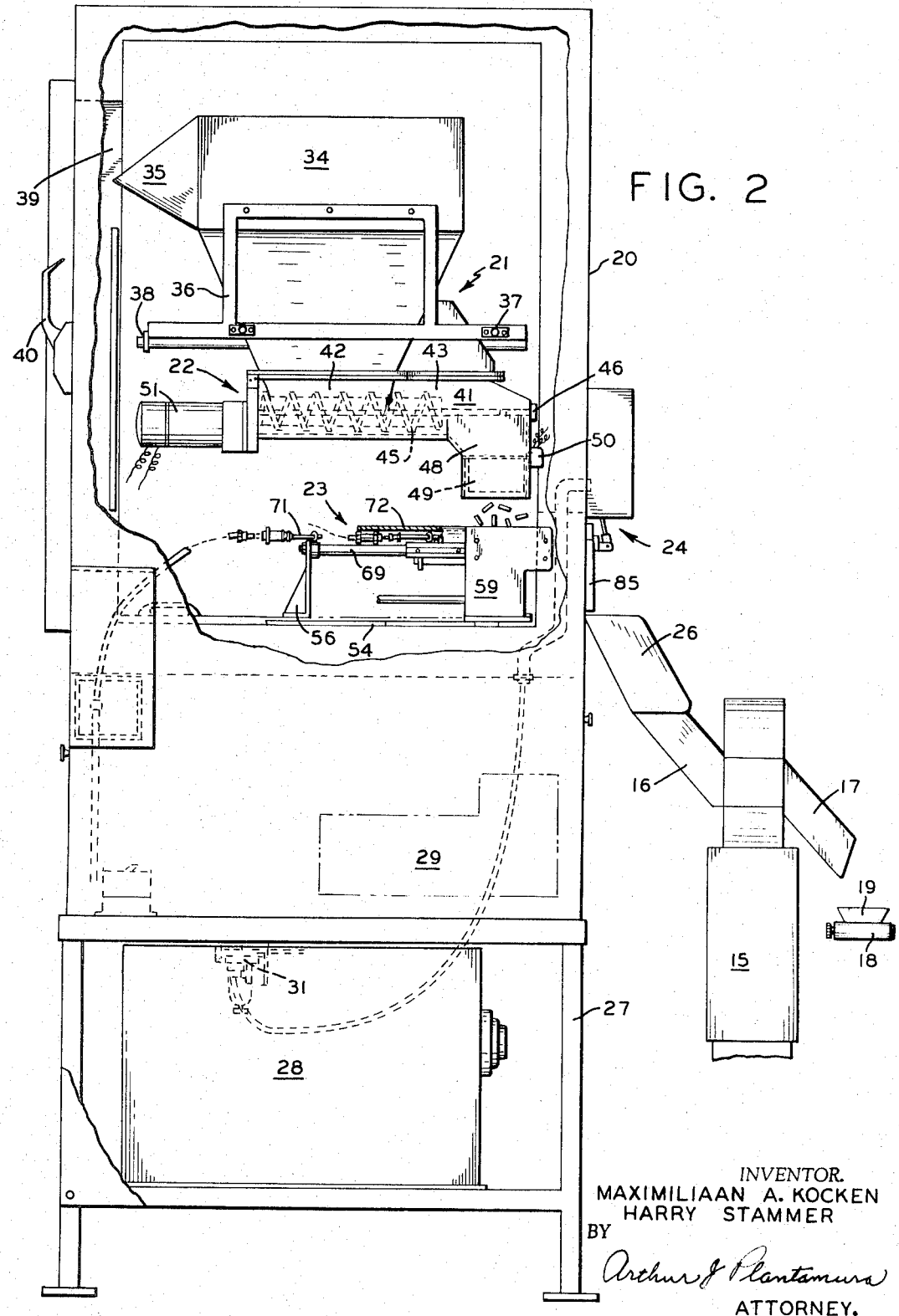
FIG. 2 is a side elevation of the storage compartment (shown partly broken away) and which houses the hopper and scale assembly, and illustrates schematically the cooking machine to which portions are delivered and the serving containers, which receive the cooked portions, positioned on a take-away conveyor.

In general, the apparatus provided by the present invention includes the capacity for storing sizable quantities in bulk of a material, e.g., blanched french fry cut potatoes, which is difficult to feed in equal increments, and upon demand wholly automatically feeding equal portions to an automatic processing apparatus for the individually fed portions. The invention incorporates screw feed means and an arrangement which prevents bridging of the product. Bridging occurs as product contiguous to the screw is removed and is not replaced because there is no shifting of the bulk. As a consequence, there is loss of positive feed, as the screw moves past the bulk of the product.

Referring in particular to the drawing, the apparatus consists of a hopper assembly 21 in which the blanched, frozen french fries are stored.

Hopper 34 is supported on a frame 36 which incorporates rollers 37. This frame assembly is moveable on a telescoping track 38 permitting easy removal of the hopper assembly from the cabinet 20 through the service door opening 39. A conventional door handle is shown at 40.

Material supply is introduced into hopper 34 through chute 35. The hopper storage is preferably suited to hold about two hundred and fifty individual orders or about fifty pounds of frozen french fry potato sticks of conventional cut size.

Attached to the hopper assembly 21 is the feed screw assembly 22, which includes drive motor 51, the feed screw 45 mounted in bearing 46 and the feed screw housing 41. The housing 41 comprises two segments; the tapered portion 42 which underlies the throat of the hopper 34 and a vertical portion 43, which leads to the feed exit section 48.

These portions 42 and 43 of the housing 41 are joined by an inclined fillet 44 whose function is important in providing effective feed of the stored material. Although alternate baffle arrangements may likewise be used, the fillet 44 is effective in producing the desired disruption of any bridging of the product tending to result during the feeding process. The function of the fillet (or baffle) is to churn or circulate away from the conveyor screw those particles of material which are in excess of the screw capacity. This excess is deflected upward into the wider area of the hopper and thereby prevents bridging and/or breaks up any bridges of product that may have developed.

As seen in FIG. 3, product deposited on screw 45 is carried in the direction of the arrow as the screw is rotated counterclockwise as viewed from FIG. 5. The housing 42 and 43 in each case at the bottom is shaped to closely follow the contour of screw 45 so that no accumulation of product will occur between the housing and the screw. The top of the housings however, is provided with a space allowing free movement of the product as it is borne from the hopper to the scale assembly 23. Exit section 48 has a portion control gate 49, and has a rotary solenoid drive 50, which actuates gate 49.

The scale assembly comprises a mounting plate 54 on which are mounted a pair of mounts 55 and 56, which support the pneumatic actuator 69. Also mounted on the plate 54 is the bottom plate 61 which supports the scale support 73. The scale is generally of conventional configuration and includes a scale platform 74 and support 75 which is pivotally mounted on arm 76. Arm 76, in turn, is pivotally mounted on 73 at 78. A parallel guide 77, pivotally connected to support 75 at one end and to support 73 at the other end serves to render stability to platform 74. A counterweight 79 is adjustably mounted on a screw 80 to provide means to adjust portion weight as desired. A stop 81, mounted on support 73 and arranged to contact arm 76, is employed to limit the travel of the platform. A switching mechanism 82 and 83, e.g., an electromagnetic type, is used to monitor the scale position.

The bottom plate 61 carries vertical supports 59 and 60 on which the guide rollers 66 and 67 are operably positioned. Mounted so as to be guided on rollers 66 and 67 by means of guides 64 and 65 is a movable ejector frame 63 which, as shown, is rectangular in configuration. It will be appreciated that this frame, which feeds the weighed portion, may comprise other appropriate shape, e.g., circular, oval, etc.

The frame 63 is connected at 68 to the piston 70 of an appropriate actuator 69, which, for example, may comprise a pneumatically operated cylinder. Air may be appropriately furnished to actuator 69 at 71. A cover plate 72 is conveniently provided to prevent material from falling into and fouling the scale mechanism. A pair of platform depressing bars 84 are employed to hold the platform down until the ejector frame 63 has returned to the portion receiving position over the scale platforms and thereby avoids any interference with the movement of frame 63.

Electrically keyed to the movement of the frame 63 is a door opening actuator 87 secured by pivot connectors 88 and plate 89 to cabinet 20. Actuator 87 as shown, is a pneumatic type, but it will be apparent that other actuators may be used in lieu thereof.

The door 85 is pivotally hinged at 86 at the top on cabinet 20 and is arranged to be operable by the same solenoid valve 31, which operates the ejector actuator 69. When solenoid valve 31 is actuated, air is admitted to cylinder 87 through inlet 93, thereby retracting piston 90 which is attached to door 85 at 91. As the door 85 opens, a cam 94 may be employed to actuate a switch 95 to stop movement of piston 90 and thereby limiting travel of the door. To close the door, air is admitted to the double-acting cylinder at 92 while venting at 93.

Figure 7:
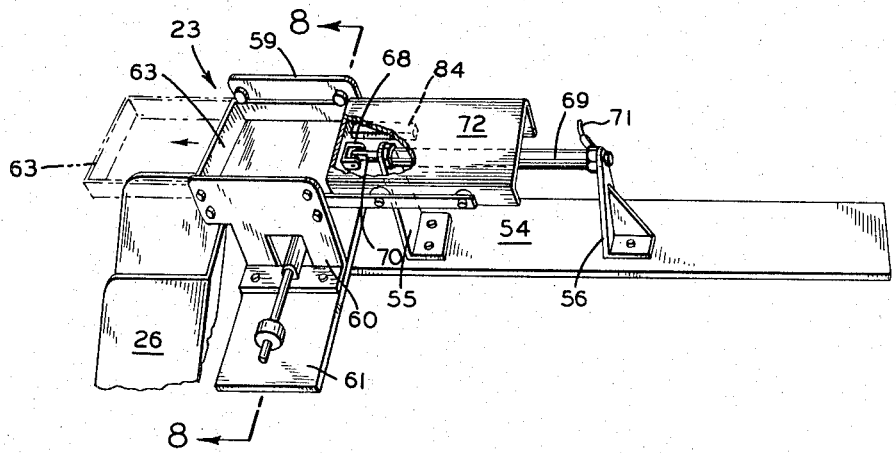
FIG. 7 is a perspective view of the scale assembly.
Figure 8:
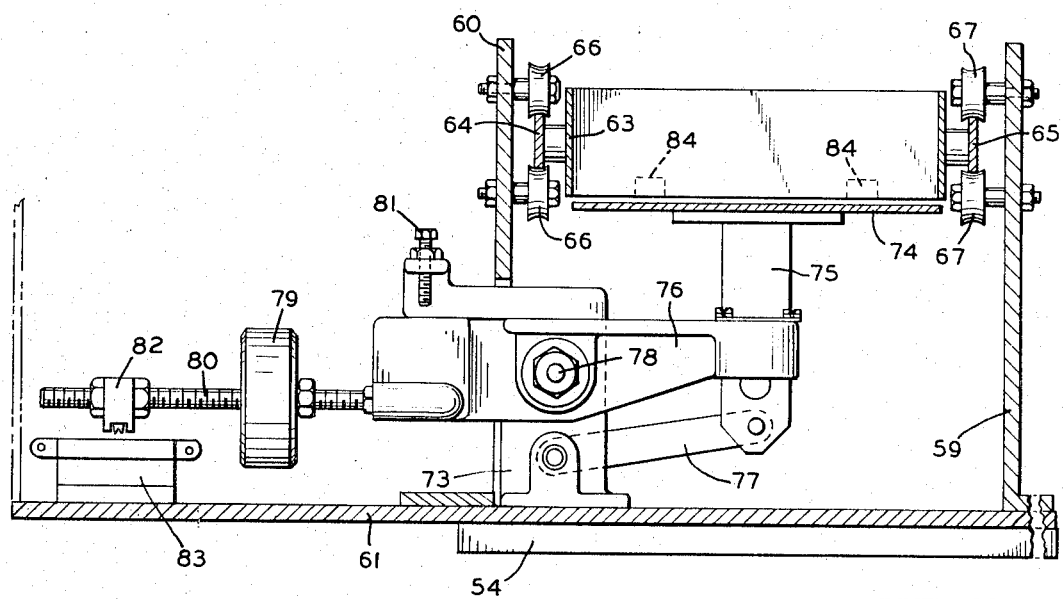
FIG. 8 is a sectional view taken along line 8—8 of FIG. 7.
Figure 9:
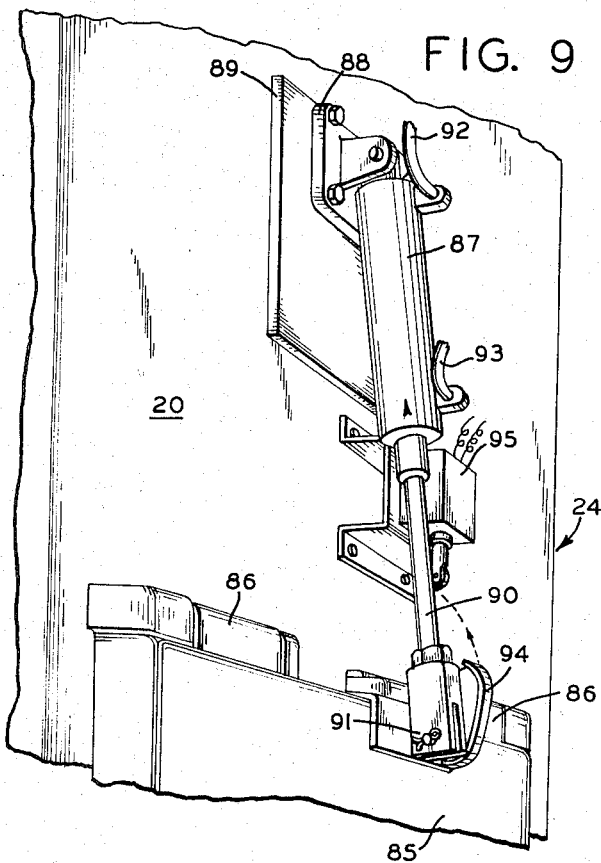
FIG. 9 is a perspective view of the cabinet door opening assembly.

From the foregoing it is seen that upon call for an order, as through the order-billing system described in the earlier-mentioned pending U.S. patent application of Alpert et al., S.N. 219,222, a portion already measured on scale platform 74 is dispensed through door 85 through chutes 26 and 16 unto the fryer 15, where it is cooked and thereafter dispensed at 17 into a container 19 positioned on take-away conveyor, 18. As the delivery is completed and frame 63 is returned by actuator 69 to its at rest position as shown in solid lines in FIG. 7, the motor 51 is actuated feeding product onto the scale platform 74 until the desired weight is present. When the predetermined weight is present within frame 63, switch 83 is opened as the platform 74 is depressed and switch closure 82 is elevated, thereby stopping further feed of product. The portion contained on platform 74 awaits a further call for an order.

Figure 10:
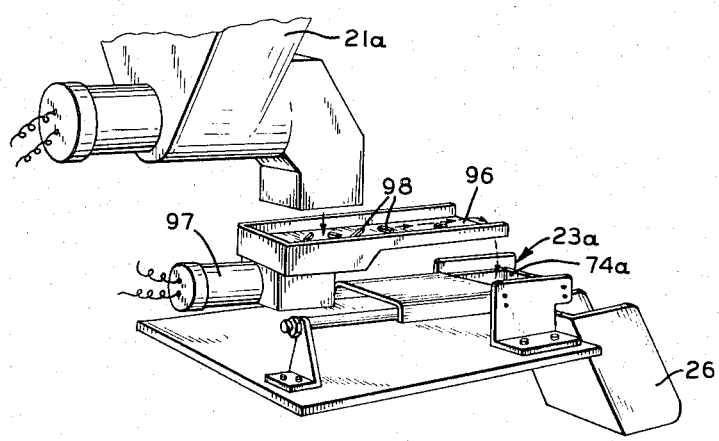
FIG. 10 is an alternate arrangement showing a feed mechanism which incorporates a vibrator to impart greater control in producing uniform portioning.

The apparatus of the invention as shown in the alternate embodiment of FIG. 10 may incorporate a vibrator surface 96 whose movement is effected by drive 97. This arrangement has the effect of providing means to dispense more uniform portions, i.e., to prevent overweight on any given portion, by distributing feed shown as 93 on surface 96 so that essentially it can be cut off after any individual piece is fed onto platform 74a. The various components of the hopper and feed assembly 21a and the scale assembly 23a are essentially similar to the corresponding alternates shown and described in connection with FIG. 1. However, when the vibrator assembly of FIG. 10 is employed it may be of lesser importance, because of the functioning of the former, to incorporate the portion control gate 49 and rotary solenoid drive 50.

Figure 11:
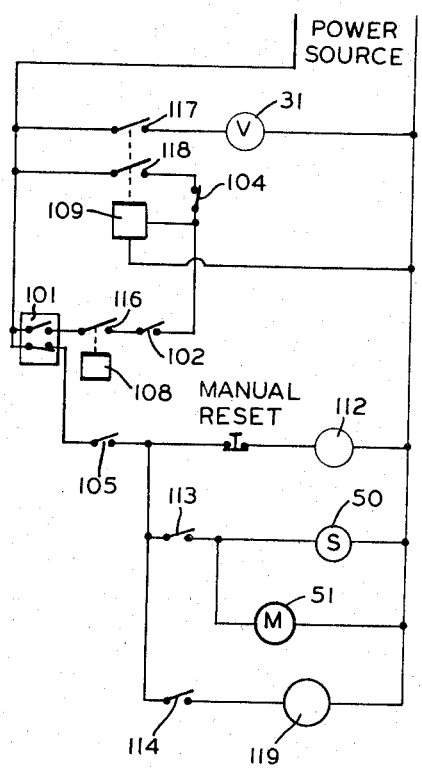
FIG. 11 is a schematic wiring diagram illustrating the electrical interconnection of the various parts of the dispensing-weighing apparatus.

The operability of the invention will be further described by reference to the wiring schematic of FIG. 11 of the drawing.

After depositing a predetermined weight of material on the scale, movement of the scale will operate scale switch 101.

An order is called for by operating relay 108 through a memory control circuit as described in U.S. patent application S.N. 219,222, thereby closing contact 116 of relay 108. In order to synchronize the operation with the fryer 15, a synchronization switch $S_2$ (102) is activated by the latter, thus completing the circuit through the relay 109.

Operation of relay 109 will close both 117 and 118 contacts, the former causing the solenoid valve 31 to be activated, the latter completing a holding circuit for the relay 109.

Activation of solenoid valve 31 will operate the ejector air cylinder and the discharge door cylinder.

Upon completion of the ejection stroke, a switch 104 is depressed and the holding circuit cancelled. This will cause deactivation of solenoid valve 31 and retraction of ejector mechanism. The latter will, upon reaching its home position, close switch 105, thereby activating the charging circuit through switch 113 to both screw drive motor 51 and portion control rotary solenoid 50. The charging circuit is controlled by the scale switch 101—stop the charging operation—upon reaching the proper weight on the scale. If, however, the scale switch does not function properly, the maximum charge time is limited by a timer 112, which will deactivate the circuit after a predetermined time, by opening switch 113, concurrently activating an alarm 119 by closing switch 114.

Various modifications apparent to those skilled in the art may be made to the concept herein provided without departing from the invention. Accordingly, the scope of the invention is not to be limited except insofar as necessitated by the appended claims.

We claim:

1. A portion-weighing and dispensing apparatus which is automatically operable on demand, comprising in combination:
   a storage hopper to hold a supply of random sized particulated material;
   a screw conveyor operably housed at the base of said hopper to convey particulated material deposited on said conveyor from said hopper;
   a scale fed by said screw conveyor and arranged to stop the feeding action of said screw conveyor when a portion of pre-determined weight has been fed by said conveyor onto said scale;
   a sweep mechanism to remove said portion from said scale to dispense said portion;
   drive means for said conveyor;
   and means to synchronize the operation of the conveyor drive and the sweep mechanism and the scale so that when a predetermined portion is deposited on said scale, said conveyor is stopped and said sweep mechanism is activated to remove the weighed portion from said scale.

2. The apparatus of claim 1, wherein said hopper is contained in a refrigerated housing and said housing is provided with an automatically operable door and wherein the means to synchronize the operation of the conveyor drive, the sweep and the scale is adapted to also synchronize the operation of the door.

3. The apparatus of claim 1, wherein said sweep mechanism comprises an actuatable frame contiguous to said scale within which the positions fed by said screw conveyor to said scale are confined and by which said portions are removed from the scale.

4. The apparatus of claim 1, comprising in combination a portion control gate interposed between said screw conveyor and said scale which is arranged to be actuated to a closed position simultaneously with the stoppage of the screw conveyor and thereby prevent deposition of residual increments on said scale.

5. The apparatus of claim 1, wherein a vibrator conveyor, whose movement is simultaneous with the movement of the screw conveyor, is interposed between said screw conveyor and said scale, said vibrator being arranged to sequentially receive increments of said material and convey them essentially individually to said scale.

6. A food dispensing and cooking system comprising the apparatus of claim 1, in combination with a cooking machine, wherein upon demand, a food supply contained in the hopper is automatically delivered by said apparatus and deposited into said machine, and, after cooking therein, is dispensed therefrom into a single portion container suitable for delivery to a customer.

7. A machine for cooking and dispensing portions of a food component such as french fried potatoes comprising:
   a source of supply of a food component;
   a measuring station for measuring portions of said food supply having substantially the same weights;
   means to convey said food portions from said source of supply to said measuring station;
   means to measure said portions at said measuring station;
   a cooking station;
   means to convey said portions from said measuring station to said cooking station;
   means to cook said portions at said cooking station;
   means to convey said cooked portions away from said cooking station; and
   mechanism for timing and coordinating the operation of said conveying means and said measuring means and said cooking means.

8. A machine for cooking and dispensing portions of a food component such as french fried potatoes comprising:
   a hopper containing pieces of food in loose form;
   a weighing station for weighing portions of said food respectively including a plurality of pieces, said portions having substantially the same weights;
   means to convey said portions from said hopper to said weighing station;
   means to weigh said portions at said weighing station;
   a cooking station;
   means to convey said portions from said weighing station to said cooking station;
   means to cook said portions at said cooking station;
   means to convey said cooked portions away from said cooking station; and
   mechanism for timing and coordinating the operation of said conveying means and said weighing means and said cooking means.

9. The machine as claimed in claim 8, including control means having a memory control relay for storing future orders.

10. The machine as claimed in claim 8, including:
    a housing,
    said hopper and said weighing station being disposed inside said housing,
    said cooking station being disposed outside said housing,
    said housing having a passage through which said conveying means from said weighing station to said cooking station extends, and
    said housing having a door for opening and closing said passage controlled by said coordinating mechanism.

11. The machine as claimed in claim 8, in which said means to convey said portions away from said cooking station includes:
    an assembly station for assembly of said food portions on dishes,
    means to convey said food portions from said cooking station to said assembly station,
    means to simultaneously convey dishes to said assembly station, and
    means to respectively assemble said food portions on said dishes.

References Cited

UNITED STATES PATENTS

| | | | |
|---|---|---|---|
| 1,646,817 | 10/1927 | Gordon | 177—145 X |
| 2,539,030 | 1/1951 | Parker | 171—145 |

BILLY J. WILHITE, *Primary Examiner.*